United States Patent [19]

Jacques

[11] 3,897,486

[45] July 29, 1975

[54] PURIFICATION OF ALIPHATIC PHOSPHONIC ACIDS

[75] Inventor: Albert M. V. Jacques, Norristown, Pa.

[73] Assignee: Amchem Products, Inc., Ambler, Pa.

[22] Filed: June 28, 1974

[21] Appl. No.: 484,504

[52] U.S. Cl............ 260/502.4 R; 260/961; 260/990
[51] Int. Cl.²............................................ C07F 9/38
[58] Field of Search............. 260/502.4 R, 961, 990

[56] References Cited
UNITED STATES PATENTS

| | | | |
|---|---|---|---|
| 3,626,037 | 12/1971 | Randall................................ | 260/961 |
| 3,629,378 | 12/1971 | Kodama et al....................... | 260/990 |
| 3,787,486 | 1/1974 | Randall et al................ | 260/502.4 R |
| 3,808,265 | 4/1974 | Randall et al................ | 260/502.4 R |

OTHER PUBLICATIONS

Kabachnik et al., "Chem. Abstracts," Vol. 42 (1948), Columns 7241–3, QD1A51.

*Primary Examiner*—Joseph E. Evans
*Attorney, Agent, or Firm*—Ernest G. Szoke; Michael E. Zall; Howard S. Katzoff

[57] ABSTRACT

A process for separating an aliphatic phosphonic acid from an aliphatic phosphonic acid half-ester, by extracting the half-ester from an aqueous mixture, containing sodium sulfate, the aliphatic phosphonic acid and the half-ester by using a halo substituted alkyl of from 1 to 8 carbon atoms, as an extracting solvent. This process is particularly useful in separating 2-chloroethylphosphonic acid from its corresponding half-ester, mono -2-chloroethyl-2-chloroethyl phosphonate.

16 Claims, No Drawings

PURIFICATION OF ALIPHATIC PHOSPHONIC ACIDS

BACKGROUND OF THE INVENTION

This invention relates to a process for the purification of aliphatic phosphonic acids, and more particularly to the purification of 2-haloethylphosphonic acids and still more particularly to the purification of 2-chloroethylphosphonic acid.

It is known in the art, that 2-haloethylphosphonic acids and derivatives thereof, are valuable as plant growth regulators in the agricultural field. Thus the compounds, particularly the chloro compounds, have been used extensively as plant growth regulators for increasing crop yield of, for example, pineapples, soybeans and the like. The usefulness of these compounds is illustrated, for example, in the publication Nature, Vol. 218, p. 974 (1969) by Cooke and Randall; and, British Pat. No. 1,194,433 of C. D. Fritz and W. F. Evans "Process and Composition for the Regulation of Plant Growth": published June 10, 1970.

One process for the preparation of 2-haloethylphosphonic acids and derivatives thereof, is the cleavage of the corresponding di-ester with aqueous HCl. The aqueous HCl acid cleavage is a procedure known in the art, it is illustrated, for example, in the textbook of Kosolapoff, entitled, Organo Phosphorous Compounds, John Wiley & Sons, Inc., N.Y., around 1950, p. 139, which indicates that esters of phosphonic acids are cleaved by hot hydrochloric or hydrobromic acids at atmospheric pressure.

Another process for the preparation of 2-haloethylphosphonic acids and derivatives thereof, is the cleavage of the corresponding di-ester with anhydrous HCl at 100° to 160° C. The anhydrous HCl acid cleavage is also a procedure known to the art. It is illustrated, for example, in the article by E. L. Gefter and N. I. Kabachnik, Plasticheskie Massy 1961, No. 1, pp. 63–64.

The above processes involve the acid cleavage of the ester groups from the di-ester of the phosphonic acid to yield the corresponding phosphonic acid.

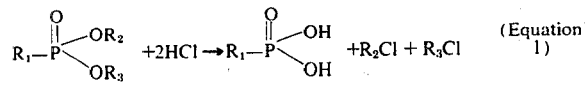

(Equation 1)

This cleavage reaction for the production of phosphonic acid occurs in a stepwise manner. The di-ester is converted to the half-ester which is in turn cleaved to the phosphonic acid.

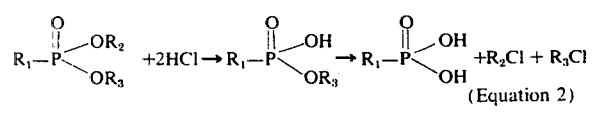

(Equation 2)

This reaction is an example of a consecutive reaction.

For example, cleavage of the bis (2-chloroethyl)-2-chloroethyl phosphonate (the di-ester), depending upon reaction conditions and concentrations of anhydrous HCl, can produce from 45% to 84% 2-chloroethylphosphonic acid and from 3% to 30% of mono-2-chloroethyl-2-chloroethylphosphonate (the half-ester of 2-chloroethylphosphonic acid).

As shown by the foregoing described processes, a major impurity resulting from the production of 2-haloethylephosphonic acid and derivatives thereof, is the half-ester of the corresponding acid.

It is highly desirable when applying 2-haloethylphosphonic acid and derivatives thereof, to plants, that the composition applied be sufficiently free of impurities, such as the half-esters of the 2-haloethylphosphonic acids, to avoid the toxic, or potentially toxic effects of these impurities on the plants. It is thus, highly desirable to remove the half-ester from the crude reaction mixture obtained from the cleavage of the di-ester of the corresponding acid.

None of the above published processes for the cleavage of the di-ester to the desired 2-haloethylphosphonic acid and derivatives thereof, has been suitable for providing the highly pure products desired for commercial use.

Further, none of the heretofore, known processes for the purification of 2-haloethylphosphonic acids and derivatives thereof, has been found suitable for providing the highly pure products for commercial use.

U.S. Pat. No. 3,626,037 "MONO-2-HALOETHYL ESTERS OF 2-HALOETHANE PHOSPHONIC ACID," by Randall and Wynn, Dec. 17, 1971, describes the extraction with benzene of the mono-2-chloroethyl ester of 2-chloroethane phosphonic acid from a reaction mixture containing this mono-ester and 2-chloroethane phosphonic acid. The disadvantages of using benzene as a commercially practical extracting solvent are that it is highly flammable, acutely toxic to humans, and gives poor phase separation when used as an extracting solvent for the half-ester of haloethylphosphonic acids.

U.S. Pat. Application Ser. No. 872,766 "PREPARATION OF BETAHALOETHYLPHOSPHONIC ACID" by D. I. Randall, filed Oct. 20, 1969, describes the extraction of the mono-ester of 2-haloethylphosphonic acid from the crude reaction mixture with a halohydrocarbon of from one to eight carbon atoms, such as, chlorobenzene, dichlorobenzene, chloroform, tetrachloroethylene and preferably methylene chloride or ethylene dichloride. The disadvantages of using halohydrocarbons alone as commercially practical extracting solvents are that they are poor extracting solvents for purifying 2-haloethylphosphonic acids.

An object of this invention is to provide a new process for purifying aliphatic phosphonic acids.

Another object of this invention is to provide a process for producing such pure acids at low cost.

Still another object of this invention is to provide a new process which is particularly suitable for purifying 2-haloethylphosphonic acid, and more particularly, 2-chloroethylphosphonic acid.

These and other objects of the invention will be more apparent from reading the following detailed description thereof.

Attainment of the above objects is made possible by the present invention which includes a process for separating an aliphatic phosphonic acid from an aliphatic phosphonic acid half-ester, by extracting the half-ester from an aqueous mixture, containing sodium sulfate, the aliphatic phosphonic acid and the half-ester by using a halo-substituted alkyl of from 1 to 8 carbon atoms, as an extracting solvent. This process is particularly useful in separating 2-chloroethyl phosphonic acid from its corresponding half-ester, mono-2-chloroethyl-2-chloroethyl phosphonate.

More particularly, the aqueous crude reaction mixture is comprised of:

an aliphatic phosphonic acid, represented by the formula:

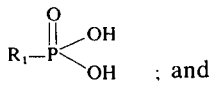

; and an aliphatic phosphonic acid half-ester, (hereinafter referred to as "half-ester") represented by the formula:

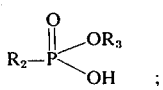

;

wherein $R_1$, $R_2$ and $R_3$ are each independently selected from the group consisting of alkyl, alkenyl, halo-substituted alkyl and halo-substituted alkenyl, all having from one to six carbon atoms. It is preferred that $R_1$, $R_2$ and $R_3$ be the same substituents. It is more preferable that $R_1$, $R_2$ and $R_3$ be 2-haloethyl; and still more preferable, 2-chloroethyl substituents, i.e. 2-chloroethyl phosphonic acid and mono 2-chloroethyl-2-chloroethyl phosphonate.

The aqueous crude reaction mixture is mixed with a quantity of sodium sulfate. Preferably, the aqueous crude reaction mixture is mixed with an aqueous saturated sodium sulfate solution.

The extracting solvent is a halo substituted alkyl of from 1 to 8 carbon atoms.

It is preferred that the halo substituted alkyl used for extraction be chloroform.

As used herein, the term alkyl represents staight or branched chain saturated hydrocarbons.

The term alkenyl represents straight or branched chain aliphatic hydrocarbons containing at least one double bond.

The terms halo-substituted alkyl and halo-substituted alkenyl includes alkyl and alkenyl groups having one or more hydrogens replaced by halogen which can be bonded to the same or different carbon atoms in the alkyl or alkenyl group.

The term halo as used herein includes all four halogens, namely chlorine, bromine, iodine and fluorine.

As only representative examples of the phosphonic acids, or mixtures thereof, which may be in the aqueous crude reaction mixture, there may be mentioned:
vinyl phosphonic acid
1-chloroethylphosphonic acid
2-chloroethylphosphonic acid
1-chloropropylphosphonic acid
2-chloropropylphosphonic acid
2-chlorobutylphosphonic acid
methylphosphonic acid
ethylphosphonic acid
propylphosphonic acid
butylphosphonic acid As only representative examples of the half-esters, or mixtures thereof, which may be in the aqueous crude reaction mixture, there may be mentioned:
mono-2-chloroethyl-2-chloroethylphosphonate
mono-2-chloroethyl-vinyl phosphonate
mono-methyl-methyl phosphonate
mono-ethyl-ethyl phosphonate
mono-ethyl-2-chloroethyl phosphonate
mono-methyl-ethyl phosphonate
mono-2-chloroethyl-methyl phosphonate The chloro substituents on the above representative examples may instead be bromo, iodo and/or fluoro.

Preferably the aqueous crude reaction mixture is comprised of 2-haloethylphosphonic acid and mono-2-haloethyl-2-haloethylphosphonate and more preferably, comprised of 2-chloroethylphosphonic acid (hereinafter referred to as "ethephon") and mono-2-chloroethyl-2-chloroethylphosphonate (hereinafter referred to as "MEPHA").

As only representative examples of the halo substituted alkyl extracting solvents, which may be used for extracting the half-ester from the aqueous crude reaction mixture containing sodium sulfate, there may be mentioned:
chloroform
tetrachloroethylene
ethylene dichloride
di-chloromethane
carbon tetrachloride The preferred extracting solvent is chloroform.

The liquid-liquid extraction procedure used for extracting the half-ester from the aqueous mixture comprised of the aliphatic phosphonic acid, the half-ester, and sodium sulfate is comprised of the step of placing in intimate contact with the aqueous mixture, the extracting solvent so that mass transfer can occur. After equalibrum has been reached, the aqueous phase (containing the major portion of the phosphonic acid and all of the sodium sulfate) and the solvent phase (containing predominantly the extracting solvent and the half-ester) are mechanically separated. After one contacting and separating sequence it may be desirable to further treat each phase, for example, in counter-current fashion. Finally, the solvent and aqueous phase may each be concentrated to obtain, respectively, the extracting solvent for reuse and the phosphonic acid.

The concentration of the solvent phase, for example, can be accomplished by distillation.

The concentration of the aqueous phase can be accomplished by mixing the aqueous phase with a low molecular weight alcohol having from 1 to 6 carbon atoms to precipitate the sodium sulfate; filtering the sodium sulfate from the aqueous phase; and then distilling of the water and alcohol. This process may be repeated several times. Preferred low molecular alcohols are methanol and isopropanol.

An example of the liquid-liquid extraction procedure used for extracting the half-ester from the aqueous crude reaction mixture containing the aliphatic phosphonic acid half-ester, is to mix with the aqueous crude reaction mixture a saturated solution of sodium sulfate; place the resulting aqueous mixture in intimate contact with the extracting solvent; agitate and let settle. There will be a phase separation. The aqueous phase will contain, primarily, the phosphonic acid and the sodium sulfate. The upper solvent phase will contain, primarily the half-ester and the extracting solvent. The phases are then separated. The solvent phase can then further be washed with water to obtain maximum separation of the aliphatic phosphonic acid from the half-ester. The aqueous phase is then mixed with a low molecular weight alcohol to precipitate the sodium sulfate. The sodium sulfate is then filtered from the aqueous phase. The aqueous phase can then, further, be flash evaporated to dryness. The precipitation of sodium sulfate followed by flash evaporation can be repeated any number of times to obtain the desired purity of aliphatic phosphonic acid. The solvent phase can be distilled to obtain the extracting solvent for reuse.

This invention contemplates the use of any standard methods of liquid-liquid extraction and any of the standard methods of concentrating the solvent and aqueous phases thus obtained from the liquid-liquid extraction.

This invention further contemplates the use of any of the standard methods of separating the precipitated sodium sulfate from the aqueous phase.

The liquid-liquid extraction may be carried out at any temperature below the boiling point of the lowest boiling component in the system. Usually the extraction is carried out at about 10° to 30°C.

The liquid-liquid extraction of the invention, further contemplates the use of any operative weight ratio of crude reaction mixture/sodium sulfate solution/total extracting solvent.

The following examples are illustrative of the various embodiments of this invention and are not to be regarded as limiting.

EXAMPLE 1

7.7 grams of pure ethephon was mixed with 2.3 grams of MEPHA to form a crude reaction mixture containing 77% ethephon and 23% MEPHA. This crude reaction mixture was mixed with 50 ml of a saturated sodium sulfate solution.

The resulting mixture was then extracted three times with about 50 ml. of chloroform. The combined solvent phases, after separation from the aqueous phases, were dried over anhydrous sodium sulfate, filtered, and flashed evaporated to dryness. 2.4 grams of material was recovered.

The combined aqueous phase, was mixed with a sufficient quantity of methanol to precipitate the sodium sulfate from the solution.

The precipitated sodium sulfate was then filtered out of this aqueous phase. The aqueous phase was then further evaporated to dryness under a vacuum of 0.09 mm Hg. for about 1½ hours at a temperature of 80°–85°C. 8.2 grams of material was obtained.

The remaining aqueous phase was then further mixed with a sufficient quantity of methanol to further precipitate the sodium sulfate. The precipitated sodium sulfate was then filtered out of this remaining aqueous phase.

The remaining aqueous phase filtrate was then flash evaporated to dryness. 7.6 grams of material was obtained containing 95.94% ethephon and 4.06% MEPHA.

EXAMPLE 2

50 grams of crude reaction mixture containing 29.4% ethephon and 55.7% MEPHA was mixed with 100 grams of saturated sodium sulfate solution. The resulting mixture was then extracted three times with 50 ml. of chloroform.

The combined solvent phases, after separation from the aqueous phases, were dried over anhydrous sodium sulfate, filtered and flash evaporated under a vacuum of 0.09 mm Hg. at a temperature of 80°–85°C for about 15 minutes. 33.1 grams of material was obtained containing 13% ethephon and 70.80% MEPHA.

The aqueous phase was then mixed with 300 ml. of methanol, precipitating sodium sulfate. The precipitated sodium sulfate was then filtered out of the aqueous phase.

The aqueous phase filtrate was then flash evaporated to dryness under a vacuum of 0.09 mm Hg. at a temperature of 80°–85°C. The residue was then retreated with methanol, filtered and flash evaporated to dryness.

The remaining aqueous phase was then further mixed with a sufficient quantity of isopropanol to further precipitate the sodium sulfate. The precipitated sodium sulfate was then filtered out of this remaining aqueous phase.

This remaining aqueous phase filtrate was then flash evaporated under a vacuum of 0.05 mm Hg. for 15 minutes, at a temperature of 80°–85°C. 14.4 grams of material was obtained containing 68.4% ethephon and 2.6% MEPHA.

The original 50 grams of crude reaction mixture contained a maximum of 6.6% vinyl phosphonic acid. After the above procedure was followed there was about 16.6% vinyl phosphonic acid in the material obtained from the aqueous phase, indicating that vinyl phosphonic acid is also concentrated by the process of this invention.

EXAMPLE 3

38 grams of crude reaction mixture containing 72.1% ethephon and 14.5% MEPHA was mixed with 50.5 grams of saturated sodium sulfate solution. The resulting mixture was then extracted 2 times with 50 ml. of chloroform. The combined solvent phases, after separation with the aqueous phases were dried over anhydrous sodium sulfate, filtered and flash evaporated under a vacuum of 0.09 mm Hg. at a temperature of 80°–85°C. 2.1 grams of material was obtained containing 11.72% ethephon and 81.20% MEPHA.

The aqueous phase was then mixed with 200 ml. of methanol precipitating sodium sulfate. The precipitated sodium sulfate was then filtered out of the aqueous phase and dried.

The aqueous phase filtrate was flash evaporated to dryness under a vacuum of 0.09 mm Hg. at a temperature of 80°–85°C.

The remaining aqueous phase was then mixed with a sufficient quantity of isopropanol to further precipitate sodium sulfate. The precipitated sodium sulfate was then filtered out of this remaining aqueous phase.

The remaining aqueous phase filtrate was then flash evaporated to dryness under a vacuum of 0.09 mm Hg. at a temperature of 80°–85°C. 20.4 grams of material was obtained containing 75.5% ethephon and 4.2% MEPHA.

The original 38 grams of crude reaction mixture contained 1.1% vinyl phosphonic acid. After the above procedure was followed there was 11.5% vinyl phosphonic acid in the material obtained from the aqueous phase, indicating that vinyl phosphonic acid is also concentrated by the process of this invention.

EXAMPLE 4

38 grams of crude reaction mixture containing 29.4% ethephon and 55.7% MEPHA was mixed with 51.2 grams of saturated sodium sulfate. The resulting mixture was then extracted 3 times with 50 ml. of chloroform. The combined solvent phases after separation from the aqueous phases, were dried over anhydrous sodium sulfate, filtered and flash evaporated under a vacuum of 0.09 mm Hg. at a temperature of 80°–85°C. 23.3 grams of material was obtained containing 15.2% ethephon and 68.7% MEPHA.

The combined aqueous phase was then mixed with 200 ml. of methanol, precipitating sodium sulfate. The precipitated sodium sulfate was then filtered out of the aqueous phase.

The aqueous phase filtrate was then flash evaporated to dryness under a vacuum of 0.09 mm Hg. at a temperature of 80°–85°C. The remaining aqueous phase was then mixed with a sufficient quantity of isopropanol to precipitate sodium sulfate. The precipitated sodium sulfate was then filtered out of this remaining aqueous phase.

The remaining aqueous phase filtrate was then flash evaporated to dryness under a vacuum of 0.09 mm Hg. at a temperature of 80°–85°C. 7.3 grams of material was obtained containing 70.8% ethephon and 3.2% MEPHA.

EXAMPLE 5

38.7 grams of crude reaction mixture containing 29.4% ethephon and 55.7% MEPHA was added to 50 ml. of water and then extracted 3 times with 50 ml. of chloroform. The combined solvent phases, after separation from the aqueous phases, were then extracted 2 times with 50 ml. of water. The combined aqueous phase resulting from the extraction with water was then added to the combined aqueous phase resulting from the extraction with chloroform.

All the combined solvent phases were dried over anhydrous sodium sulfate, filtered and flash evaporated under a vacuum of 0.09 mm Hg. at a temperature of 80°–85°C. 13.3 grams of material was obtained containing 1.6% ethephon and 76.1% MEPHA.

The combined aqueous phase was then flash evaporated under a vacuum of 0.09 mm Hg. for 30 minutes at a temperature of 80°–85°C. resulting in a quantity of material containing 48% ethephon and 32.3% MEPHA.

This material containing 48% ethephon and 32.3% MEPHA, was then added to 10 ml. of water. The resulting mixture was extracted 3 times with 40 ml. of chloroform. The combined solvent phases, after separation from the aqueous phases, were dried over anhydrous sodium sulfate, filtered and flash evaporated under a vacuum of 0.09 mm Hg. at a temperature of 80°–85°C. 5.5 grams of material was obtained containing 15.5% ethephon and 69.1% MEPHA.

The aqueous phase was then flash evaporated under a vacuum of 0.05 mm Hg. for 30 minutes at a temperature of 80°–85°C. 14.5 grams of material was obtained containing 68.3% ethephon and 8.75% MEPHA.

The resulting 14.5 grams of material, containing 68.3% ethephon and 87.5% MEPHA, was then added to 5 ml. of water and extracted 3 times with 50 ml. of chloroform. The combined solvent phases, after separation from the aqueous phases, were dried over anhydrous sodium sulfate, filtered and flash evaporated to dryness under a vacuum of 0.05 mm Hg. at a temperature of 80°–85°C. 1.3 grams of material was obtained containing 33% ethephon and 55.2% MEPHA.

The aqueous phase was then flash evaporated under a vacuum of 0.05 mm Hg. for 30 minutes at a temperature of 80°–85°C. 11.2 grams of material was obtained, containing 81.7% ethephon and 3.2% MEPHA.

A comparison of this Example with Example 4, both of which started with the same quantity and quality of crude reaction mixture, indicates that mixing sodium sulfate in the crude reaction mixture increases the efficiency of extraction.

In Example 4, 38 grams of crude reaction mixture was mixed with 51.2 grams of saturated sodium sulfate solution and extracted with a total of 150 ml. of chloroform to yield an aqueous phase material containing 70.8% ethephon and 3.2% MEPHA; whereas in Example 5, 38.7 grams of crude reaction mixture was mixed with 150 ml. of water and extracted with the same amount of chloroform, to yield an aqueous phase material containing 48.0% ethephon and 32.3% (i.e. 10 times the amount of Example 4) MEPHA.

Moreover in Example 5, in order to reduce the MEPHA content to the 3.2% level obtained in Example 4, it was necessary to use a total of 420 ml. of chloroform.

EXAMPLE 6

26.7 grams of crude reaction mixture containing 71.4% ethephon and 18.7% MEPHA was mixed with 30 grams of saturated sodium sulfate solution. The resulting mixture was then extracted 3 times with 20 ml. of chloroform. The combined solvent phases, after separation from the aqueous phases, were dried over anhydrous sodium sulfate, filtered and flash evaporated under a vacuum of 0.09 mm Hg. at a temperature of 80°–85°C. 2 grams of material was obtained containing 13.4% ethephon and 77.7% MEPHA.

The combined aqueous phase was then mixed with 100 ml. of methanol, precipitating sodium sulfate. The precipitated sodium sulfate was then filtered out of the aqueous phase.

The aqueous phase filtrate was then flash evaporated to dryness under a vacuum of 0.09 mm Hg. at a temperature of 80°–85°C.

The remaining aqueous phase was then mixed with a sufficient quantity of isopropanol to precipitate the sodium sulfate. The precipitated sodium sulfate was then filtered out of this remaining aqueous phase.

The remaining aqueous phase filtrate was then flash evaporated to dryness under a vacuum of 0.09 mm Hg. at a temperature of 80°–85°C. 12.9 grams of material was obtained containing 84% ethephon and 8.2% MEPHA.

EXAMPLE 7

I. a. 176.8 grams of crude reaction mixture containing 60% ethephon and 29.7% MEPHA was mixed with 200 grams of saturated sodium sulfate solution. The resulting mixture was extracted twice with 100 ml. of chloroform, followed by extraction 3 times 50 ml. of chloroform. The combined solvent phases, after separation from the aqueous phase, were dried over anhydrous sodium sulfate, filtered and flash evaporated under a vacuum of 0.09 mm Hg. at a temperature of 80°–85°C. 41.6 grams of material was obtained containing 12.9% ethephon and 79% MEPHA.

b. The combined aqueous phase was then mixed with 300 ml. of methanol precipitating sodium sulfate. The precipitated sodium sulfate was then filtered out of the aqueous phase, and dried.

c. The aqueous phase filtrate was then flash evaporated to dryness under a vacuum of 0.09 mm Hg. at a temperature of 80°–85°C.

The remaining aqueous phase was then mixed with 108 grams of isopropanol, precipitating sodium sulfate. The precipitated sodium sulfate was then filtered out of the remaining aqueous phase.

d. The remaining aqueous phase filtrate was then flash evaporated under a vacuum of 0.23 mm Hg. for 30 minutes at a temperature of 80°–85°C. 138.3 grams of material was obtained containing 76.8% ethephon and 13.6% MEPHA.

II. a. The resulting 138.3 grams of material obtained was further mixed with 150.4 grams of saturated sodium sulfate solution. The resulting mixture was then extracted once with 200 ml. of chloroform followed by extraction twice with 100 ml. of chloroform. The combined solvent phases, after separation from the aqueous phases, were dried over anhydrous sodium sulfate, filtered and flash evaporated under a vacuum of 0.09 mm Hg. at a temperature of 80°–85°C. 11.8 grams of material was obtained containing 17.2% ethephon and 69.7% MEPHA.

b. The combined aqueous phase was then mixed with 300 ml. of methanol precipitating sodium sulfate. The precipitated sodium sulfate was then filtered out of the aqueous phase and dried.

The aqueous phase filtrate was then flash evaporated under a vacuum of 0.9 mm Hg. for 20 minutes at a temperature of 80°–85°C. The remaining aqueous phase filtrate was then mixed with 100 grams of isopropanol, further precipitating sodium sulfate. The precipitated sodium sulfate was then filtered out of the aqueous phase.

c. The remaining aqueous phase filtrate was then flash evaporated under a vacuum of 1.06 mm Hg. for 30 minutes at a temperature of 80°–85°C. 117 grams of material was obtained containing 84.2% ethephon and 8.15% MEPHA.

III. The 112.2 grams of material containing 84.2% ethephon and 8.15% MEPHA, was further processed as in paragraph II(a) and II(b) to obtain a final 92 grams of material containing 87.8% ethephon and 5.9% MEPHA.

I claim:

1. A process for separating an aliphatic phosphonic acid, represented by the general formula:

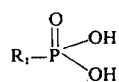

from an aliphatic phosphonic acid half-ester, represented by the general formula:

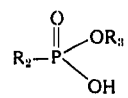

wherein $R_1$, $R_2$ and $R_3$ are each independently selected from the group consisting of alkyl, alkenyl, halo-substituted alkyl and halo-substituted alkenyl, all having from 1 to 6 carbon atoms, which comprises the step of extracting the half-ester from a first aqueous mixture containing:
 a. the half-ester;
 b. the phosphonic acid; and
 c. a quantity of sodium sulfate; with a halo-substituted alkyl of from one to eight carbon atoms to form a second aqueous mixture containing predominantly the phosphonic acid and all of the sodium sulfate.

2. The process of claim 1, further comprised of the step of concentrating the phosphonic acid in the second aqueous mixture.

3. The process of claim 2, wherein the step of concentrating is comprised of:
 mixing the second aqueous mixture with a low molecular weight alcohol having from one to six carbon atoms, to precipitate the sodium sulfate;
 filtering the sodium sulfate from the second aqueous mixture.

4. The process of claim 3, wherein the low molecular weight alcohol is methanol.

5. The process of claim 3, wherein the low molecular weight alcohol is isopropanol.

6. The process of claim 1, wherein the halo-substituted alkyl is chloroform.

7. The process of claim 1, wherein $R_2$ and $R_3$ are the same.

8. The process of claim 1, wherein $R_1$, $R_2$ and $R_3$ are the same.

9. The process of claim 1, wherein $R_2$ and $R_3$ are the same halo-substituted alkyl.

10. The process of claim 1, wherein $R_1$, $R_2$ and $R_3$ are the same halo-substituted alkyl.

11. The process of claim 1, wherein $R_2$ and $R_3$ are the same halo-substituted alkyl and $R_1$ is alkenyl.

12. The process of claim 1, wherein the half-ester is mono-2-haloethyl-2-haloethylphosphonate and the aliphatic phosphonic acid is 2-haloethylphosphonic acid.

13. The process of claim 1, wherein the half-ester is mono-2-chloroethyl-2-chloroethylphosphonate and the aliphatic phosphonic acid is 2-chloroethylphosphonic acid.

14. The process of claim 1, wherein the half-ester is mono-2-chloroethyl-2-chloroethyl phosphonate and the aliphatic phosphonic acid is vinyl phosphonic acid.

15. The process of claim 1, wherein the half-ester is mono-2-chloroethyl-2-chloroethylphosphonate, the aliphatic phosphonic acid is 2-chloroethylphosphonic acid and the halo-substituted alkyl is chloroform.

16. The process of claim 1, wherein the quantity of sodium sulfate is sufficient to about saturate the first aqueous mixture.

* * * * *